(12) United States Patent
Joseph

(10) Patent No.: US 6,736,281 B2
(45) Date of Patent: May 18, 2004

(54) VACUUM-RELEASE WASTE RECEPTACLE

(75) Inventor: Neil J. Joseph, Saxtons River, VT (US)

(73) Assignee: Sonnax Industries, Inc., Bellows Falls, VT (US)

(*) Notice: Subject to any disclaimer, the term of this patent is extended or adjusted under 35 U.S.C. 154(b) by 11 days.

(21) Appl. No.: 10/124,685

(22) Filed: Apr. 19, 2002

(65) Prior Publication Data

US 2003/0197016 A1 Oct. 23, 2003

(51) Int. Cl.⁷ .............................. B65D 25/14
(52) U.S. Cl. ................................ 220/495.04
(58) Field of Search ........................ 220/495.04

(56) References Cited

U.S. PATENT DOCUMENTS

| | | | |
|---|---|---|---|
| 4,294,379 A | 10/1981 | Bard | 220/404 |
| 4,890,760 A | 1/1990 | Nicoll, Sr. et al. | 220/404 |
| 5,265,755 A | 11/1993 | McArthur, Jr. et al. | 220/601 |
| 5,375,732 A | 12/1994 | Bowers et al. | 220/404 |
| 5,388,717 A | 2/1995 | LeVasseur | 220/404 |
| 5,492,241 A | 2/1996 | Barnett et al. | 220/404 |
| 5,803,303 A | 9/1998 | Timm et al. | 220/495.04 |
| 6,000,571 A | 12/1999 | Brooks et al. | 220/495.04 |
| 6,015,063 A | 1/2000 | Poliquin | 220/495.04 |

*Primary Examiner*—Joseph Man-Fu Moy
(74) *Attorney, Agent, or Firm*—Clifford F. Rey

(57) ABSTRACT

A vacuum-release waste receptacle designed to prevent vacuum adherence of a plastic liner disposed within the present receptacle upon removal of the liner. The present invention provides a waste receptacle including a plurality of air baffles formed on the inner sidewalls of the receptacle and projecting inwardly into the interior space of the receptacle and to its bottom wall. The air baffles are fabricated to a predetermined dimension, which is calculated to provide an indentation of sufficient depth in the filled plastic liner to create air conduits between the plastic liner, the air baffles, and the inner surface of the receptacle. The air conduits permit the ingress of atmospheric air into the receptacle providing for vacuum-release of the plastic liner upon its removal. Various alternative embodiments of the present waste receptacle are disclosed featuring different configurations of the air baffles.

14 Claims, 10 Drawing Sheets

VACUUM-RELEASE WASTE RECEPTACLE

FIELD OF INVENTION

The present invention relates generally to waste containers and, more particularly, to a vacuum-release waste receptacle constructed to prevent vacuum adherence and tearing of a filled plastic bag or liner disposed therein upon removal from the receptacle.

BACKGROUND OF THE INVENTION

Many consumers have experienced the difficulty inherent in removing a plastic liner from a molded plastic trash container. Often when densely packed waste materials and/or garbage are collected in such a trash container, the liner adheres to the inside surface of the trash container creating a vacuum effect and is difficult to remove. As a result the filled liner can be torn open and the contents spilled upon removal. This presents a significant problem in medical offices and hospitals where the accumulated waste materials may include chemicals, contaminated liquids, and/or bodily fluids.

Various vented waste containers are known in the prior art. Such prior art vented waste containers comprise venting systems and apparatus including valves, molded air passages, vented double-walled construction, and other vacuum release features which are designed to permit pressure equalization within the waste container. However, these venting systems are relatively complex and substantially increase manufacturing costs.

One example of such a prior art waste container is disclosed in U.S. Pat. No. 5,375,732 to Bowers et al., which teaches a garbage container including an air conduit directed within the container coextensively of a side wall thereof extending into the container cavity such that the air conduit includes side wall openings to effect vacuum release when a plastic liner is positioned within the garbage can. However, molded air conduits of this design require complex molding tools, which add substantially to manufacturing costs.

Another example of such a waste container is disclosed in U.S. Pat. No. 6,000,571 to Brooks et al., which describes a trash receptacle having inner and outer side-wall portions defining an air space. The inner base of the inner portion has a plurality of apertures extending into the air space between the inner and outer bases to permit airflow from the air space into the interior space of the trash receptacle to relieve the vacuum formed when a trash bag is removed from the interior space. Such double-walled construction increases manufacturing complexity and costs substantially.

Yet another example of a vented waste container is disclosed in U.S. Pat. No. 6,015,063 to Poliquin, which pertains to a trash can vent system including a vent channel member having an edge securing cap formed at one end for attachment to an existing waste container and also having a number of vent openings formed between an inner vent channel and the surface of the vent channel member facing the trash can liner. Such vent devices are a costly add-on, and typically become dislodged from the container upon removal of a filled liner.

Still another example of a vented waste container is disclosed in U.S. Pat. No. 5,492,241 to Barnett et al., which teaches a vented refuse container including a vent assembly that extends along a sidewall of the container to vent air beneath the trash bag. Similarly, U.S. Pat. No. 4,294,379 to Bard describes a vented trash receptacle having a plurality of peripherally positioned hollow tubes, which are interior to or molded into the walls of the receptacle. The integrally molded versions of this corner-type vent increase manufacturing complexity and costs. The add-on version with adhesive tape presents installation and fit problems.

Another category of prior art waste containers include vented openings which extend through the sidewalls or bottom wall of the container. One example of such a vented trash can is disclosed in U.S. Pat. No. 5,388,717 to LeVasseur, which teaches a trash container wherein a vent extends through the side wall adjacent a bottom wall of the container such that a plastic trash bag can be removed from the container without interference from vacuum otherwise created therein. Another example of this general type of vented waste container is disclosed in U.S. Pat. No. 5,803,303 to Timm et al. comprised of an upstanding waste basket having an arch-shaped foot securement cavity extending completely through the bottom of the main housing. The foot securement cavity is designed to permit a person's foot to enter and secure the container to the floor while removing a refuse liner. The arch-shaped member includes a plurality of evenly spaced vacuum holes to reduce the vacuum created by the refuse liner and the container during removal of the refuse liner.

U.S. Pat. No. 5,265,755 to McArthur, Jr. et al., pertains to a trash receptacle including a vent means mounted in the bottom thereof for eliminating the formation of a vacuum when a filled trash bag liner is removed from the receptacle. The air vent holes are disposed in a central vertical stalk located on the inner base portion of the receptacle, which allows air to ingress/egress from the outside atmosphere to the interior of the receptacle.

Finally, U.S. Pat. No. 4,890,760 to Nicoll et al. discloses a trash receptacle including a valve mounted in the bottom thereof for breaking the vacuum, which is created when the trash liner positioned within the receptacle is lifted for the purposes of trash removal. The valve is mounted in the central raised bottom portion of the receptacle and is surrounded by a peripheral portion having radially extending passages, which allow ambient air to flow inwardly to break the vacuum.

While these devices fulfill their respective objectives and requirements, such waste containers having vent openings that extend through the container walls and are unsuitable for use with hazardous chemicals, contaminated waste, and/or bodily fluids as might be encountered in medical offices, hospitals, and other settings.

The present invention substantially departs from the conventional concepts and designs of the prior art, and in so doing provides a vacuum-release waste receptacle suitable for this purpose at substantially reduced manufacturing costs.

SUMMARY OF THE INVENTION

Accordingly, the present invention is a vacuum-release waste receptacle designed to prevent vacuum adherence and tearing of a filled plastic bag or liner disposed within the present receptacle upon its removal. To accomplish this the present invention provides a waste receptacle including an air baffle formed on the inner surface of at least one sidewall of the receptacle and projecting inwardly into the interior space of the receptacle and to its bottom wall. The air baffle is fabricated to a predetermined dimension, which is calculated to provide a linear indentation of sufficient depth in the filled plastic liner to create an air conduit between the plastic liner, the air baffle, and the inner surface of the receptacle providing for vacuum release of the plastic liner upon removal. Various alternative embodiments of the present waste receptacle are disclosed featuring different configurations of the air baffles.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
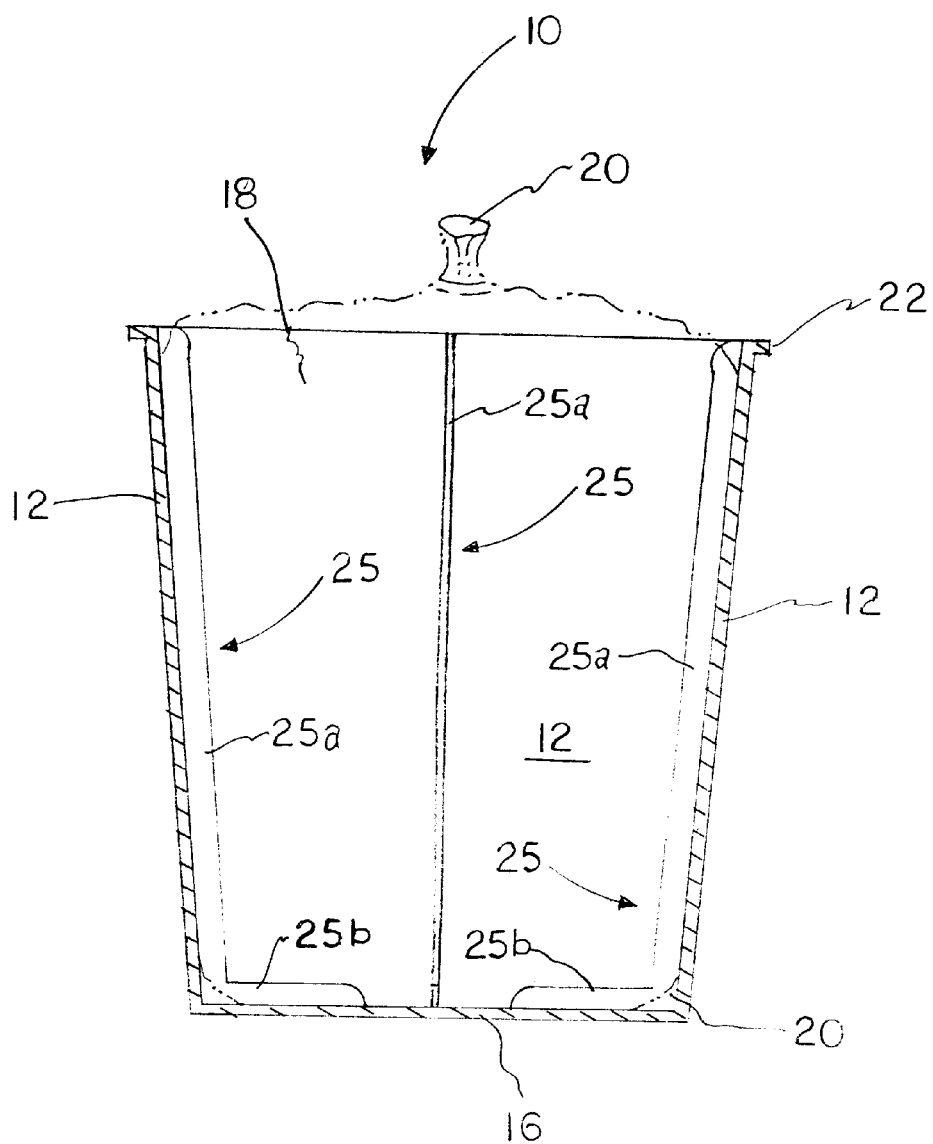
FIG. 1 is a cross-sectional view of the vacuum release waste receptacle of the present invention.

With further reference to the drawings there is shown therein a vacuum release waste receptacle in accordance with the present invention, indicated generally at 10 and illustrated in FIG. 1. In a preferred embodiment the present waste receptacle 10 is a trapezoidal solid with rounded corners having a plurality of sidewalls 12 and a bottom wall 16. However, other configurations for receptacle 10 are encompassed by the present invention.

Sidewalls 12 may be integrally formed with bottom wall 16 or may be attached to the bottom wall using fasteners, adhesives, or other known techniques or devices. Sidewalls 12 and bottom wall 16 define an interior space 18, with the upper edge of the sidewalls 12 defining an upper opening 19 into interior space 18 for receiving a plastic trash bag or liner 20. An annular flange 22 may be provided, if desired, extending around the upper opening 19 of the receptacle 10 to provide rigidity to receptacle 10 and to facilitate handling thereof.

In the preferred embodiment the present vacuum release waste receptacle 10 is fabricated from materials such as polyehthylene, polypropylene, polyvinyl chloride or other thermoplastic material suitable for this purpose by an injection molding process. Receptacle 10 may also be made from metal, wood, and other suitable materials known to those skilled in the art.

Because it is desirable to prevent vacuum adherence of the filled trash bag or liner 20 to the inner surface of the receptacle 10 upon removal, the present invention incorporates vacuum-releasing means for pressure equalization within the receptacle including, but not limited to, the following structures. At least one air baffle, indicated generally at 25, is attached to one or more sidewalls 12 of the present waste receptacle 10 to affect vacuum release of a filled trash liner 20 upon removal from the receptacle as hereinafter explained in further detail.

In a preferred embodiment each air baffle 25 is a generally L-shaped structure when viewed in side elevation as shown in FIG. 1. Each air baffle 25 is comprised of a generally vertical segment 25a attached to the inner surface of sidewall 12 and a generally horizontal segment 25b attached to the inner surface of bottom wall 16. Such vertical segment 25a is typically positioned at the approximate midline of the sidewall 12 to which it is attached, and extends from the annular flange 22 to the bottom surface 16 as seen in FIG. 1. However, the present invention encompasses the use of vertical segments 25a that extend less than the full distance between flange 22 and bottom wall 16, and/or are not centered on the midline of sidewall 12.

Figure 2:
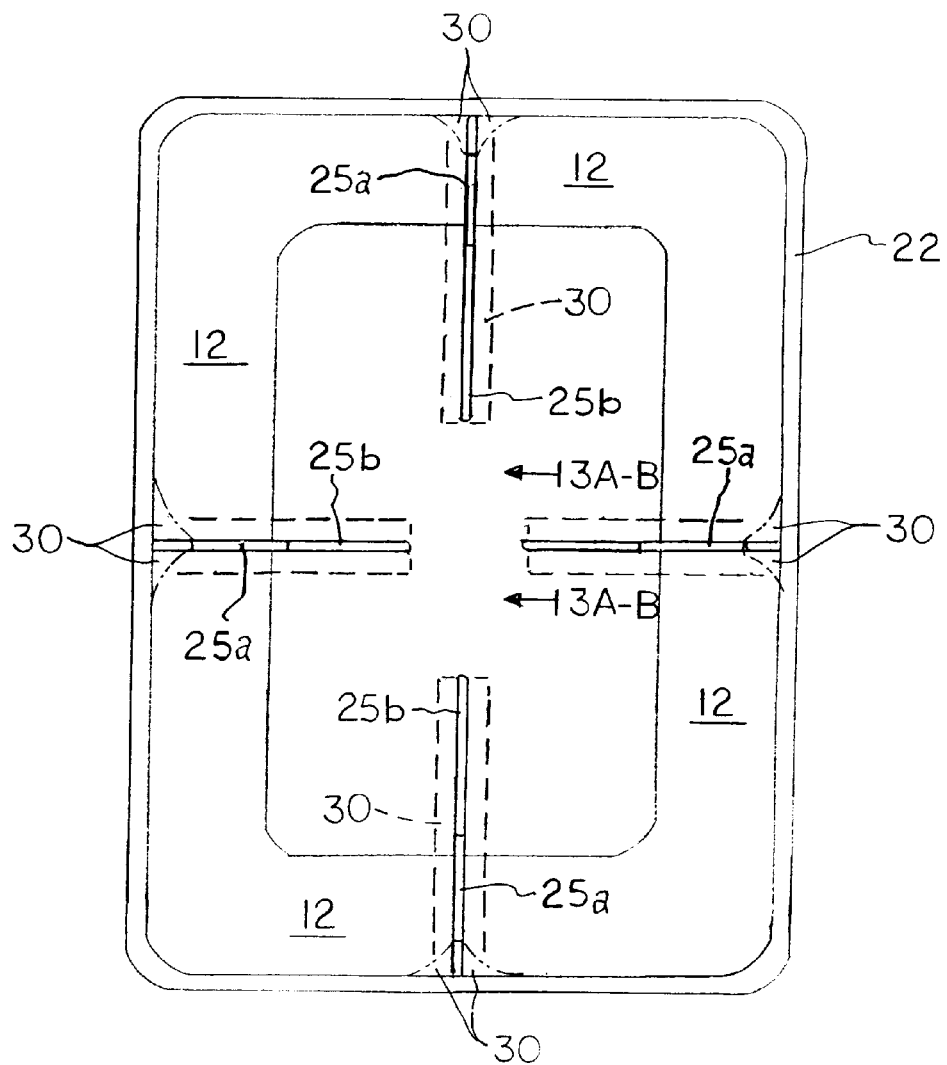
FIG. 2 is a top plan view of one embodiment of the present waste receptacle illustrating the location of the air baffles.

Each air baffle 25 projects inwardly into the interior space 18 of the waste receptacle 10 to a predetermined dimension in transverse, typically perpendicular relation to the sidewalls 12. This construction of the air baffles 25 is calculated to produce air conduits as at 30 at the juncture of the air baffles 25 with the sidewalls 12 and a filled plastic liner 20 as shown in FIG. 2. Vertical segments 25a should extend to a location sufficiently proximate to flange 22 that air conduits 30 are in fluid communication with the surrounding atmosphere via opening 19.

More particularly, the inwardly facing edges of the air baffles 25 produce linear indentations in the liner 20 of sufficient depth to hold the liner 20 away from the sidewalls 12 adjacent air baffles 25 as shown in FIG. 3. As the liner 20 is filled, the accumulated weight of the waste materials draws the liner 20 over the air baffles 25 under increasing tension thereby forming the temporary air conduits 30.

The air conduits 30 extend along the entire length of each air baffle 25 from the annular flange 22 to the bottom surface 16 as depicted in FIG. 2 providing for the ingress of atmospheric air around the liner 20. Positioning the air baffles 25 on opposite sidewalls 12 allows for shifting of the filled liner 20 from side-to-side during removal while assuring that at least one air conduit 30 will be unobstructed allowing the flow of ambient air through the conduit 30 for pressure equalization within the receptacle 10.

As more clearly shown in FIG. 3, air baffles 25 project inwardly into the interior space 18 of the waste receptacle 10 to a predetermined height dimension "X", which generally varies in the range of 0.0625 to 1.500 inches depending on the size of the receptacle 10 and the physical characteristics of the waste materials.

Accordingly, the height dimension "X" of the air baffles 25 may be varied as the waste materials (i.e. paper, solids, particulates, foods, semi-liquids, etc.) intended for disposal within the present receptacle 10 increase in weight and density. This is because the cross-sectional area of the air conduits 30 may be reduced by compression of the filled liner 20 due to the weight and density of the waste materials contained therein.

Figure 3A:
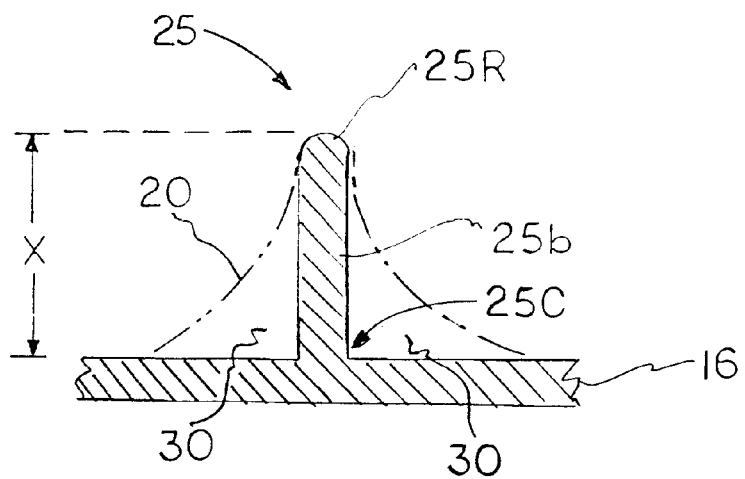
FIG. 3A is an enlarged cross-sectional view of an air baffle taken along section line 3A—3A of FIG. 2 showing the formation of air conduits intermediate the air baffle and the plastic liner.

In order to provide the maximum cross-sectional area for air conduits 30 the corner radius 25C at the juncture of the air baffles 25 and the interior surface of the sidewalls 12 is minimized (FIG. 3A). In the preferred construction the radius 25C is in the range of 0.025 to 0.125 inches. The dimensions of the radius 25C may vary in accordance with the type of material, structural strength requirements, and manufacturing tolerances for the receptacle 10.

Figure 3B:
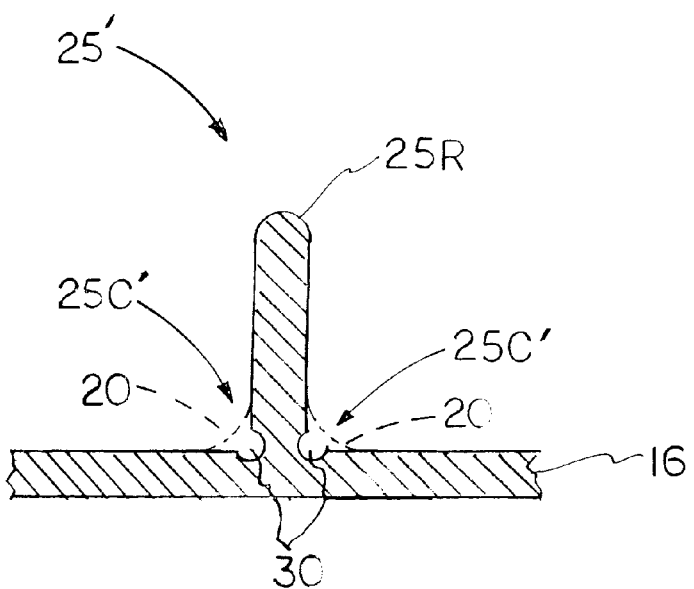
FIG. 3B is an enlarged cross-sectional view of an air baffle taken along section line 3B—3B of FIG. 2 showing an alternative configuration of the air conduits intermediate the air baffle and the plastic liner.

In an alternative construction the corner juncture of the air baffles 25 and the sidewalls 12 are provided with an undercut radius 25C', which is coextensive with the air baffles 25 and provides a modified air conduit 30' as illustrated in FIG. 3B. Typically the undercut radius 25C' is also in the range of 0.025 to 0.125 inches. Thus, even if the cross-sectional area of the air conduits 30' is reduced by compression of the filled liner 20, a minimum cross-sectional area of the air conduit 30' equal to at least the cross-sectional area of the undercut radius 25C' is maintained for pressure equalization.

The air baffles 25 may be provided with a radius formed at the terminal edge 25R (FIGS. 3A and 3B) thereof to prevent cutting and subsequent tearing of the filled plastic liner 20 upon removal from the receptacle 10. In the preferred embodiment the radius 25R at the distal edge of the air baffles 25 will be approximately equal to one-half of its thickness. For example, an air baffle 25 having a thickness dimension of 0.125 inches would have an edge radius 25R of approximately 0.0625 inches.

Figure 4:
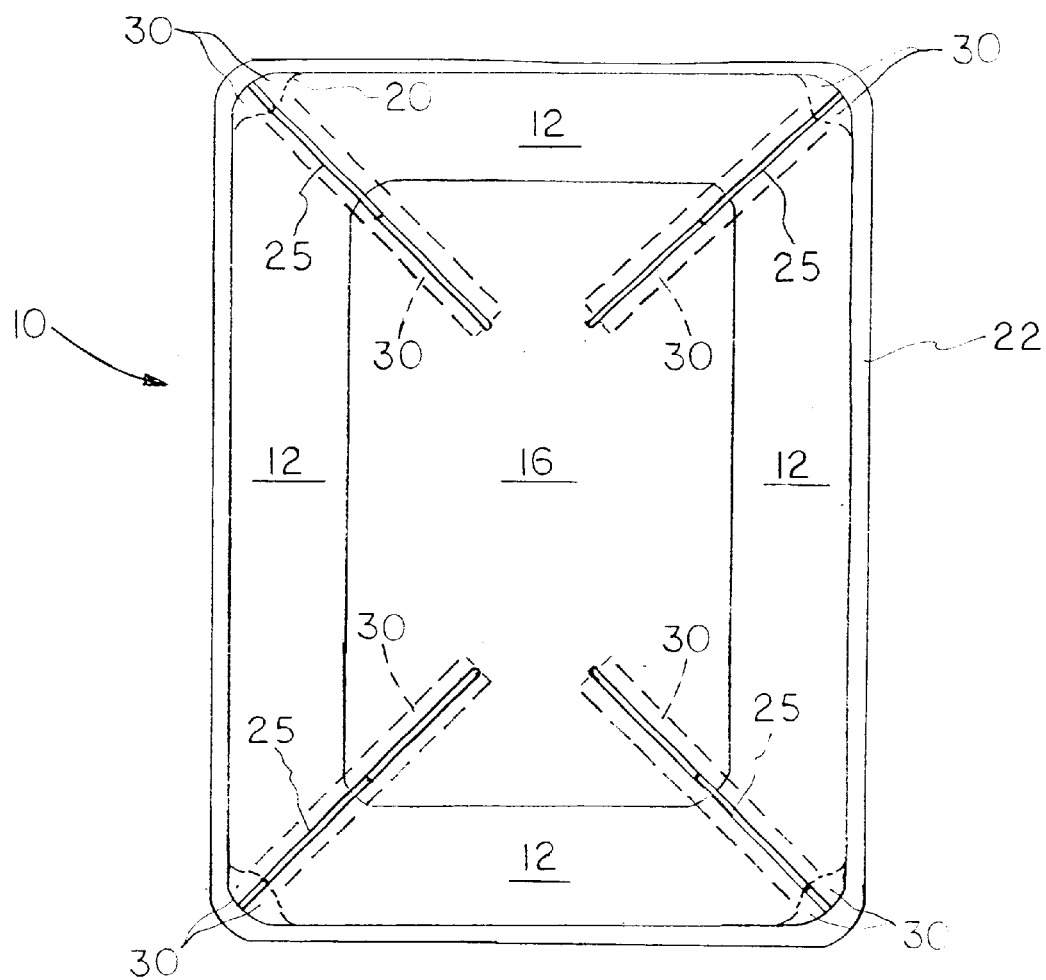
FIG. 4 is a top plan view of an alternative embodiment of the present waste receptacle illustrating another configuration of the air baffles therein.

In an alternative embodiment it will be seen that the air baffles 25 are disposed at the corner junctures of sidewalls 12 as shown in FIG. 4. In this embodiment air conduits 30 are similarly formed along the entire length of the air baffles 25 at the corners of the receptacle 10 and extending to the bottom surface 16 thereof.

Figure 5A:
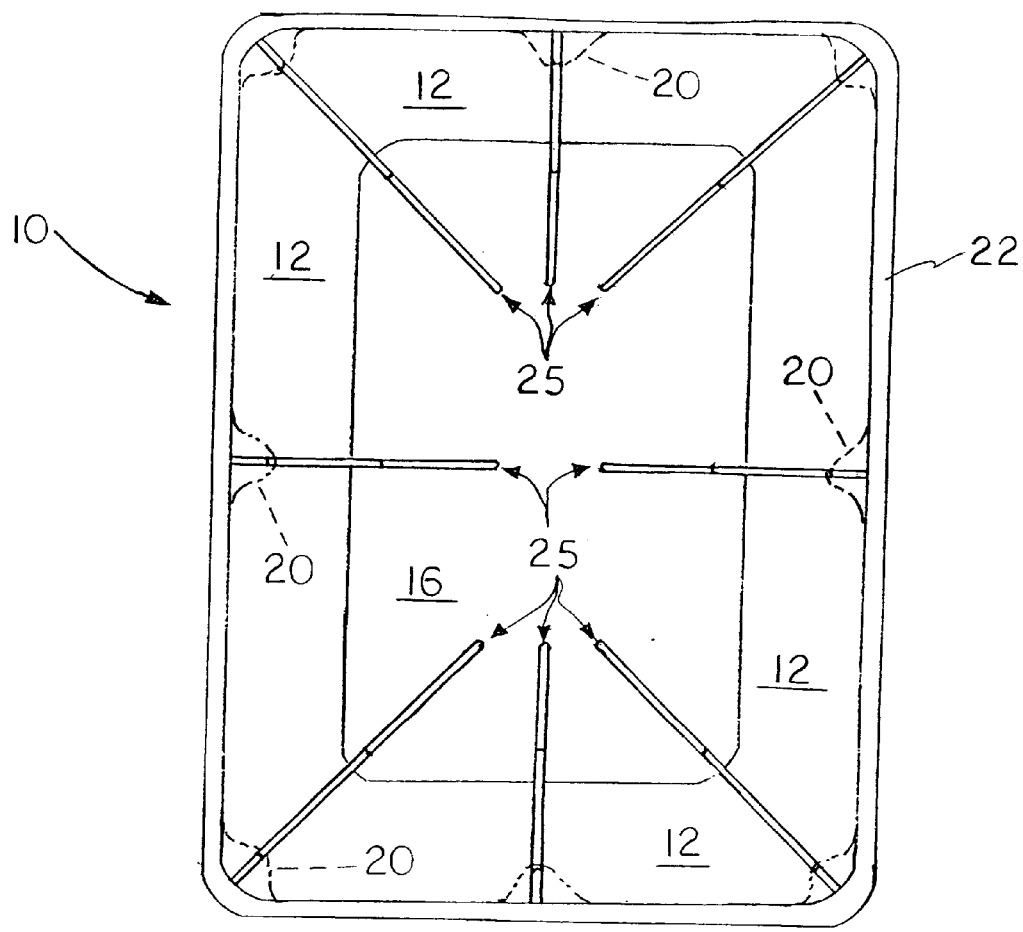
FIG. 5A is a top plan view of an alternative embodiment of the present waste receptacle illustrating another configuration of the air baffles therein.
Figure 5B:
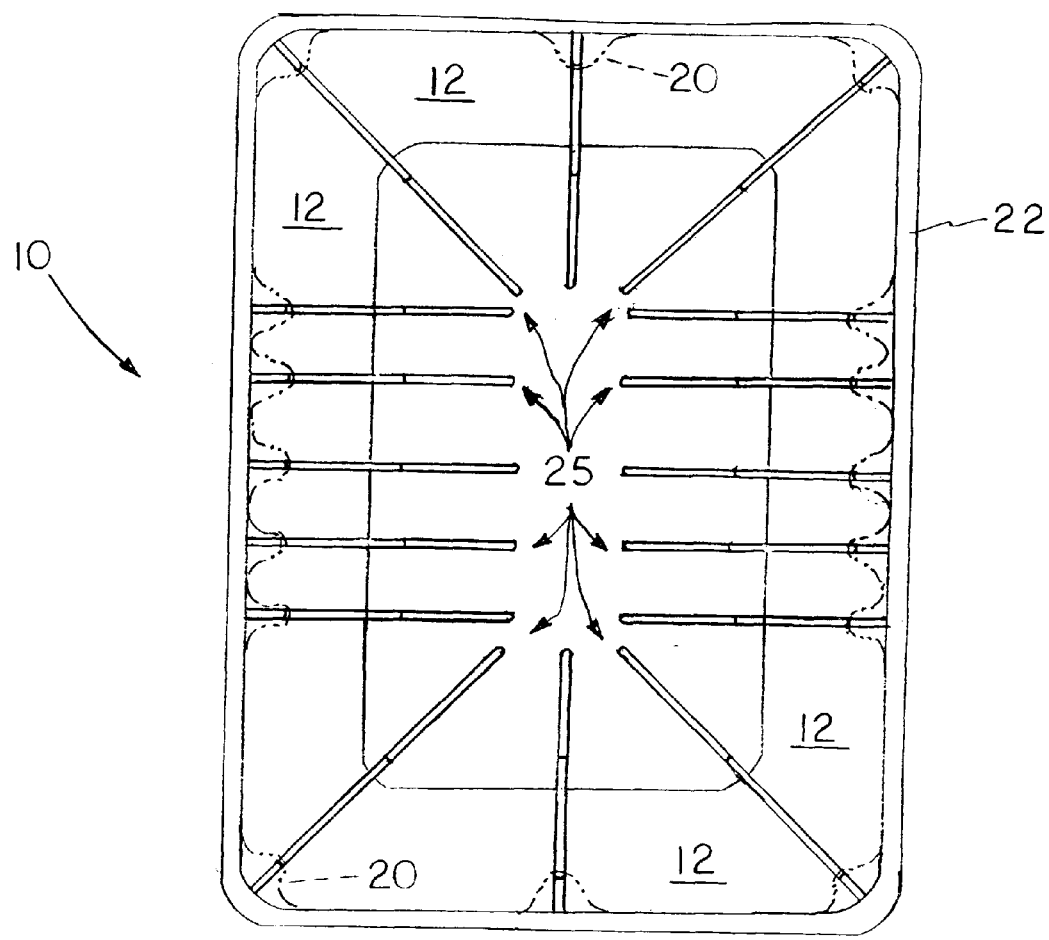
FIG. 5B is a top plan view of an alternative embodiment of the present waste receptacle illustrating yet another configuration of the air baffles therein.
Figure 5C:
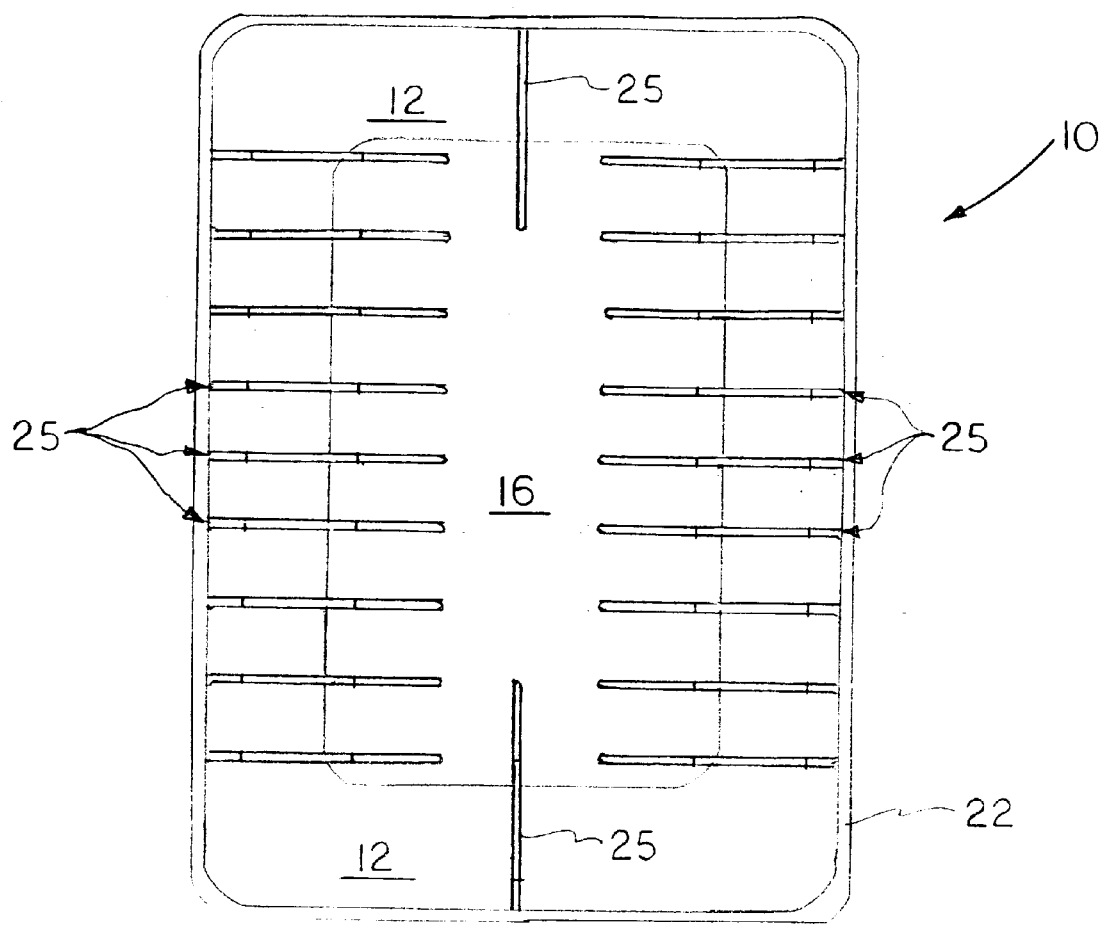
FIG. 5C is a top plan view of an alternative embodiment of the present waste receptacle illustrating still yet another configuration of the air baffles therein.

It will be understood that air baffles 25 may be arranged in various other configurations within the waste receptacle 10 and that a plurality of such air baffles 25 of like construction may be employed on sidewalls 12 at more frequent intervals as illustrated in FIGS. 5A–5C for a given application of the present receptacle. For example, FIG. 5A illustrates an alternative embodiment wherein air baffles 25 are disposed at the midline of each sidewall 12 and at the corner junctures of each sidewall. FIG. 5B illustrates an alternative embodiment wherein a plurality of air baffles 25 are disposed in parallel relation at spaced-apart intervals along the lateral sidewalls 12, at the midline of the adjacent sidewalls 12, and at the corner junctures of each of the sidewalls. FIG. 5C illustrates an alternative embodiment wherein a plurality of air baffles 25 are disposed in parallel relation at spaced-apart intervals along the lateral sidewalls 12 and at the midline of each adjacent sidewall 12.

Further, the arrangement and number of air baffles 25 provided may be varied to accommodate other shapes and sizes of receptacles commonly provided for residential, commercial and industrial waste disposal. For example, FIG. 6 illustrates a cylindrical waste receptacle, indicated generally at 10', wherein a plurality of air baffles 25' have been integrated into the cylindrical sidewall 12'.

Figure 6:
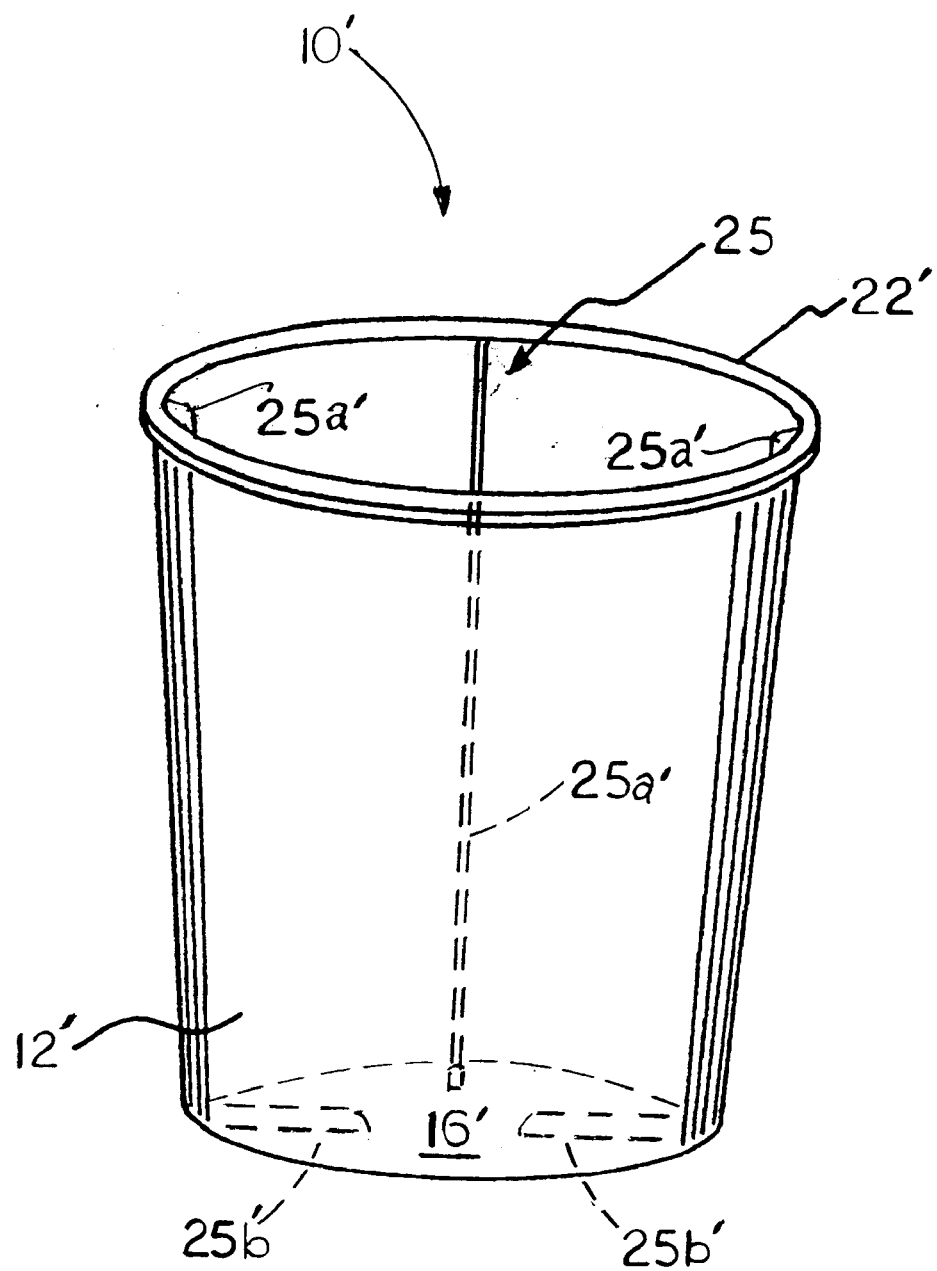
FIG. 6 is a perspective view of an alternative embodiment of the present waste receptacle in a tapered cylindrical configuration.

In this embodiment air baffles 25' comprising a generally vertical segment 25a' and a horizontal segment 25b' are provided on the inwardly tapered cylindrical sidewall 12' of the receptacle 10' at approximately 90 degree intervals and extending from the annular flange 22' to the bottom surface 16' as seen in FIG. 6.

Figure 7A:
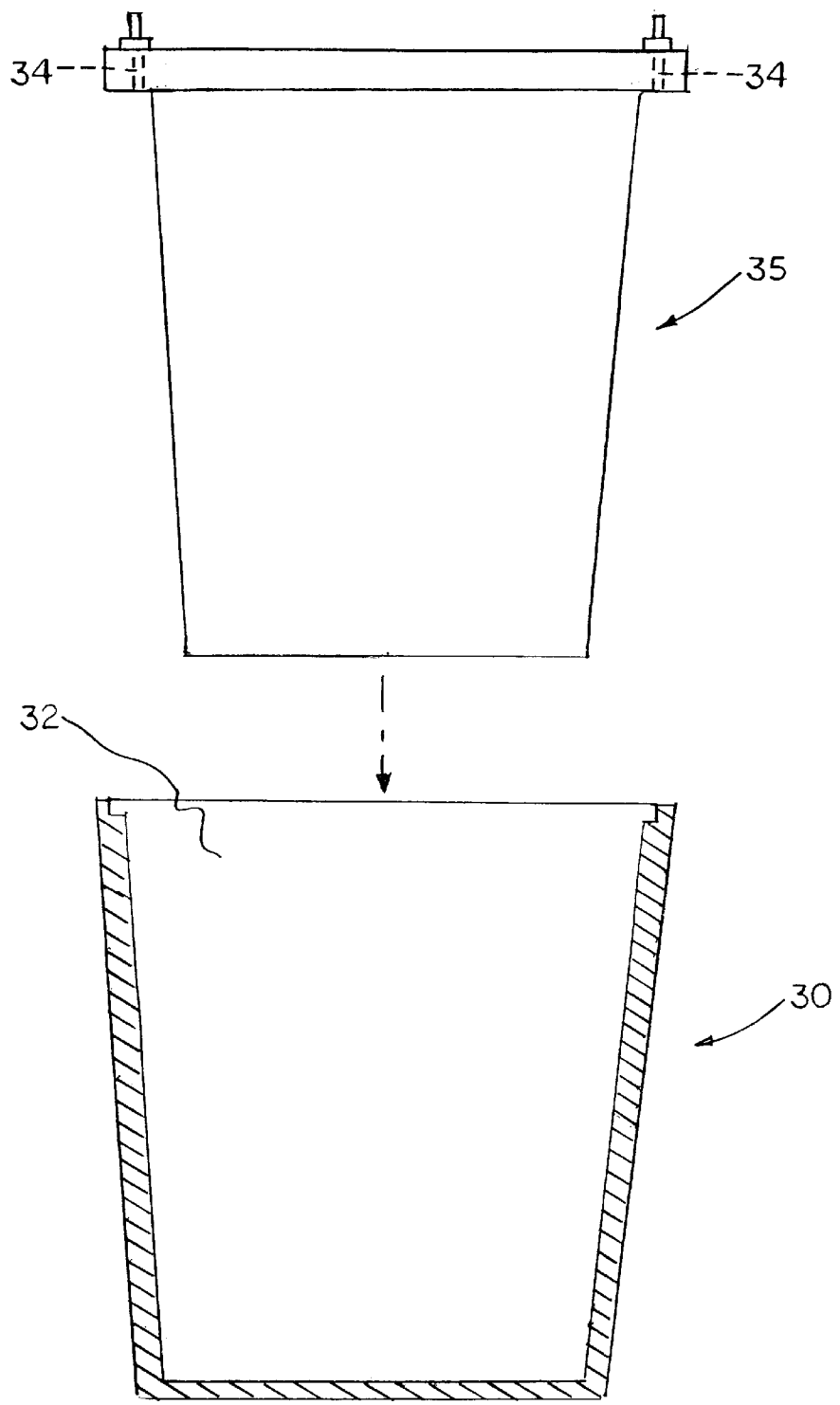
FIG. 7A is an exploded diagrammatic view of a pre-existing injection molding tool utilized in the manufacture of plastic waste receptacles being labeled Prior Art.
Figure 7B:
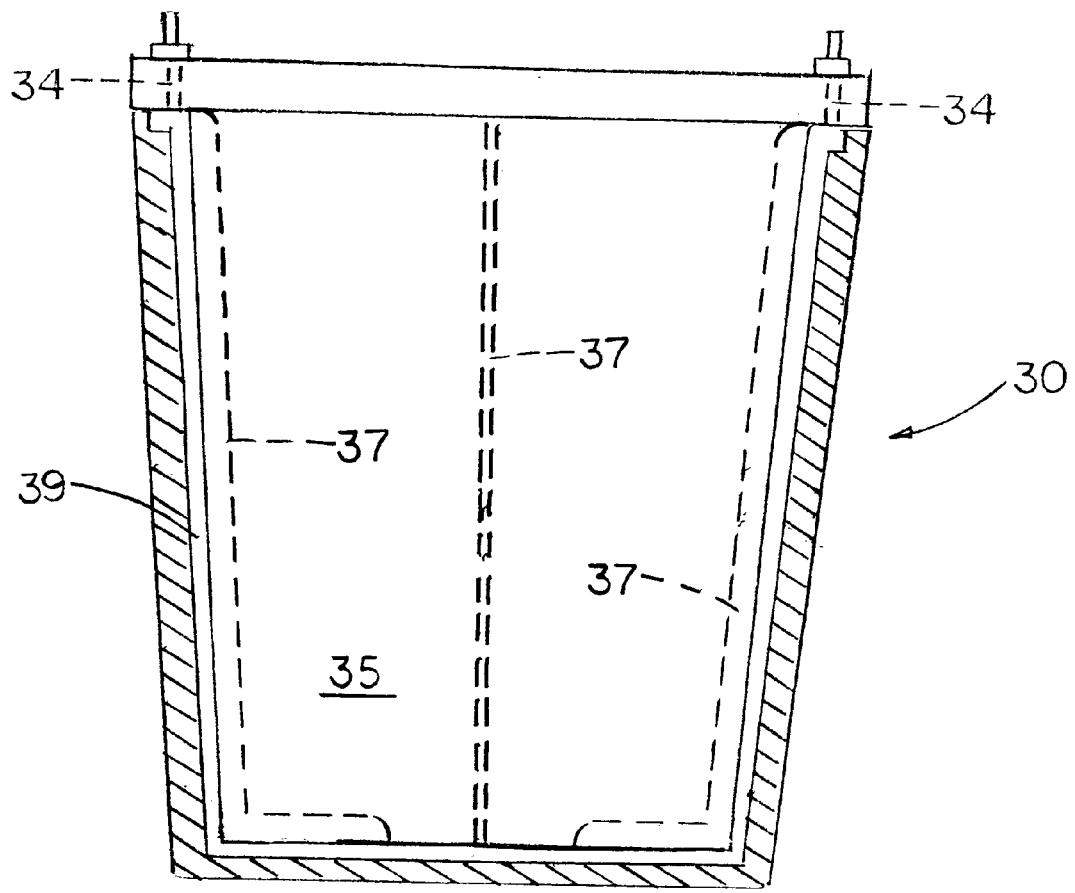
FIG. 7B is a cross-sectional view of the injection molding tool of FIG. 7A in an assembled condition and modified to manufacture the vacuum release waste receptacle of the present invention.

Advantageously, the present waste receptacles 10, 10' can be manufactured by modification of pre-existing molding tools utilized for thermoplastic injection molding of waste receptacles lacking the air baffles 25 of the present invention. Referring to FIG. 7A there is shown therein a cavity mold, indicated generally at 30, and a mating core member, indicated generally at 35, which are utilized for plastic injection molding of prior art waste receptacles similar to the present, receptacle 10, but lacking the vacuum-release features (i.e. air baffles 25) of the present invention. In such an injection molding process the core member 35 is inserted into the inner cavity 32 of the mold 30 and secured thereto such that a void 39 (FIG. 7B) defining the structure of the waste receptacle 10 is formed. During the molding process a thermoplastic material (not shown) is introduced into the void 39 via internal passages 34 in a liquid state to fabricate the waste receptacle.

In accordance with the present invention such pre-existing molding tools can be modified to produce the present vacuum release trash receptacles 10,10' by the following process. Initially, a plurality of slots or grooves 37 corresponding to the desired configuration of air baffles 25 in the receptacle 10 to be injection molded are laid out on the core member 35. In the alternative, numerical coordinates corresponding to the slots or grooves 37 to be machined into the core member 35 are programmable into a computerized machine tool (not shown) using known techniques. Next, the slots or grooves 37 are machined into the core member 35 corresponding to the air baffles 25 to be molded using a conventional milling machine or computerized (CNC) milling machine. Thereafter, the modified core member 35 including slots 37 is utilized to fabricate the waste receptacle 10 of the present invention including the air baffles 25 by a similar plastic injection molding process.

It will be appreciated by those skilled in the art that the machining process described hereinabove may require multiple machining steps and cutting tool changes to accomplish the required result. Further, changes in the operating parameters of the injection molding process and equipment may also be required to produce the present vacuum release waste receptacle.

Thus, it can be seen that the present invention provides a vacuum-release waste receptacle designed to prevent vacuum adherence and tearing of a filled plastic liner disposed within the present receptacle upon its removal. To accomplish this the present invention provides a waste receptacle including an air baffle attached to at least one sidewall of the receptacle and projecting inwardly into the interior space of the receptacle and to its bottom wall. The air baffle is fabricated to a predetermined dimension, which is calculated to provide an indentation of sufficient depth in the filled plastic liner to create an air conduit between the plastic liner, the air baffle, and the inner surface of the receptacle providing for vacuum-release of the plastic liner.

Although not specifically illustrated in the drawings, it should be understood that additional structural components may be provided as necessary and that all of the components described above are arranged and supported in an appropriate fashion to form a complete and operative vacuum-release waste receptacle incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A vacuum-release waste receptacle for use in combination with a trash can liner, said receptacle comprising:

a plurality of sidewalls, each with an upper edge and an interior surface, and a bottom wall attached to said plurality of sidewalls so that said bottom wall and said plurality of sidewalls define an interior space, wherein said upper edges define an opening in communication with said interior space; and an air baffle comprising a generally L-shaped structure formed on said interior surface of at least one of said sidewalls and projecting inwardly into said interior space to form a linear indentation in the liner producing an air conduit between the liner and said at least one sidewall, when the liner is positioned in said interior space, that is in fluid communication with said opening.

2. A vacuum-release waste receptacle of claim 1, wherein said air baffle is disposed along the vertical midline of said at least one sidewall extending from a location proximate said upper opening to said bottom wall of said receptacle.

3. A vacuum-release waste receptacle for use in combination with a trash bag, said receptacle comprising:

a plurality of sidewalls, each with an upper edge and an interior surface, and a bottom wall attached to said plurality of sidewalls such that said bottom wall and said plurality of sidewalls define an interior space, wherein said upper edges define an opening in communication with said interior space; and an air baffle comprising a generally L-shaped structure formed on said interior surface of at least one of said sidewalls and projecting inwardly into said interior space to a predetermined dimension to form an air conduit between the trash bag and said at least one sidewall, when the liner is positioned in said interior space, that is in fluid communication with said upper opening to provide pressure equalization within said receptacle.

4. A vacuum-release waste receptacle of claim 3, wherein said air baffle is disposed along the vertical midline of each of said at least one sidewalls extending from a location proximate said top opening to said bottom wall of said receptacle.

5. A vacuum-release waste receptacle of claim 3, wherein said air baffle is disposed at the vertical corner junctures of said sidewalls extending from a location proximate said top opening to said bottom wall of said receptacle.

6. A vacuum-release waste receptacle of claim 3, wherein said air baffle is disposed along a vertical midline of at least two of said sidewalls and also at a vertical corner juncture of at least two of said sidewalls extending from a location proximate said top opening to said bottom wall of said receptacle.

7. A vacuum-release waste receptacle of claim 3 further including a plurality of air baffles disposed along each of said plurality of sidewalls at regular intervals parallel to said vertical midline of each of said sidewalls.

8. A vacuum-release waste receptacle of claim 3, wherein said predetermined dimension is in the range of 0.0625 to 1.500 inches.

9. A vacuum-release waste receptacle of claim 8 wherein the inward edges of said air baffles include a radius formed thereon to prevent tearing of said trash bag.

10. A vacuum-release waste receptacle of claim 9 wherein the corner junctures of said air baffles and said interior surface of said receptacle are provided with an undercut radius coextensive with said air baffle producing modified air conduits having a maximum cross-sectional area.

11. A vacuum-release waste receptacle for use in combination with a trash liner, said receptacle comprising:

a plurality of sidewalls, each with an upper edge and an interior surface, and a bottom wall attached to said plurality of sidewalls such that said bottom wall and said plurality of sidewalls define an interior space, wherein said upper edges define an opening in communication with said interior space; and vacuum-releasing means for pressure equalization within said receptacle including an air baffle comprising a generally L-shaped structure formed on said interior surface of at least one of said sidewalls and projecting inwardly to a predetermined dimension forming an air conduit between the liner and said interior surface in fluid communication with said upper opening for the ingress of atmospheric air.

12. A vacuum-release waste receptacle of claim 11, wherein said air baffle comprising said generally L-shaped structure is disposed along the vertical midline of said at least one sidewall extending from a location proximate said upper opening to said bottom wall of said receptacle.

13. A vacuum-release waste receptacle of claim 11 wherein said predetermined dimension is in the range of 0.0625 to 1.500 inches.

14. A vacuum-release waste receptacle of claim 13 wherein the inward edges of said air baffle include a radius formed thereon to prevent tearing of the liner.

* * * * *